April 7, 1936.  P. W. FORSBERG  2,036,803
MOTOR GENERATOR LOCOMOTIVE
Filed June 15, 1932

Motoring

Regenerating

Inventor:
Peter W. Forsberg,
by Charles W. Mullan
His Attorney.

Patented Apr. 7, 1936

2,036,803

UNITED STATES PATENT OFFICE 2,036,803

MOTOR GENERATOR LOCOMOTIVE

Peter W. Forsberg, Schenectady, N. Y., assignor to General Electric Company, a corporation of New York Application June 15, 1932, Serial No. 617,398

3 Claims. (Cl. 172—239)

My invention relates to control systems for variable voltage drives wherein the driving motor is subjected to an overhauling as well as a motoring load, and has for an object the provision of a simple and reliable control of the motor for motoring and regenerative operations.

While my invention has other applications, it is particularly applicable to a railway locomotive arranged to be operated from either high voltage A. C. or D. C. power supply which is transformed to low voltage direct current by means of a motor generator set for the traction motors.

Heretofore, a motor designed for operation at a high voltage has been connected directly across the supply source and has been arranged to drive a load generator. This load generator was connected in a closed circuit with the driving motor to form a variable voltage drive of a well known type. To provide excitation for the motor field windings during regeneration an auxiliary generator has been provided which was only used during the regenerative operation of the motor.

In accordance with my invention in one form thereof, I provide an auxiliary generator permanently connected in series with the driving motor and the load generator together with means for connecting return circuits from the series field windings of the motor to the auxiliary generator so that this generator may supply excitation to the motor field windings for regenerative operation.

Figure 1:
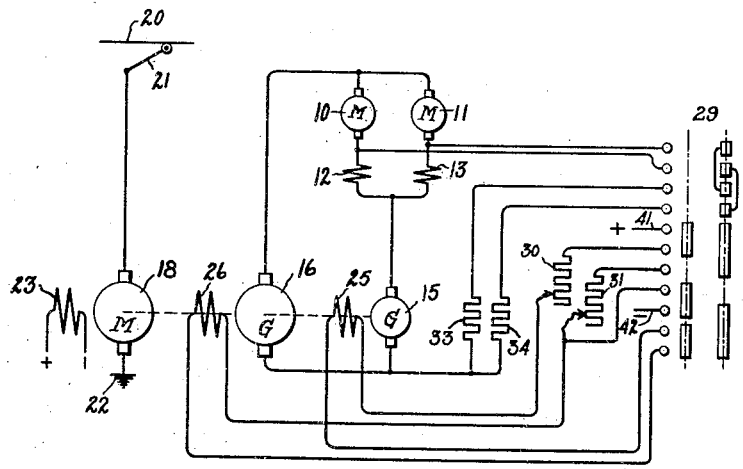
Figure 2:
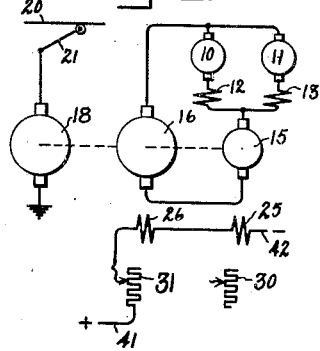
Figure 3:
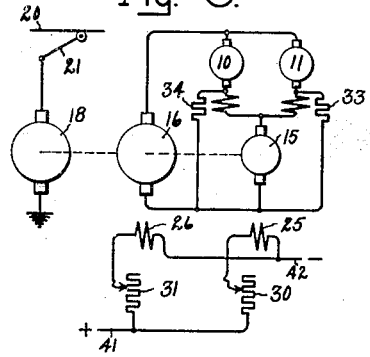

For a more complete understanding of my invention, reference should now be had to the drawing in which Fig. 1 diagrammatically illustrates my invention as applied to a locomotive. Fig. 2 illustrates the connections completed by the operation of the controller to its first position, while Fig. 3 illustrates the connections completed by the controller when operated to its second position for regenerative braking.

Referring to the drawing, I have shown my invention in one form as applied to the control of the driving motors 10 and 11, each provided with series field windings 12 and 13. The motors 10 and 11 are connected in parallel with each other and in series with an auxiliary generator 15 and a load generator 16. A high voltage motor 18 is arranged to receive power from the supply conductor 20 by means of the trolley 21, a return circuit being provided by the ground connection 22. A separately excited field winding 23 is arranged to provide excitation of the motor 18. The field windings 25 and 26, respectively, provided on the auxiliary generator 15 and the load generator 16 are arranged to be excited by means of connections completed by a master controller 29. A pair of field rheostats 30 and 31 may be used to control the excitation of the field windings 25 and 26. For regenerative operation, a pair of resistances 33 and 34 are arranged to be connected by the master controller 29 to provide return circuits from the series field windings of the motors 10 and 11 to the auxiliary generator 15.

With the above understanding of the elements and their organization with respect to each other in the system, the operation of the system itself and the manner in which the auxiliary generator 15 is utilized for both regenerative and motoring operations will be readily understood from the description which follows: In the operation of my invention it will be assumed that the supply lines are energized in accordance with the well understood symbols for direct current. The trolley 20 may be energized from either an alternating or a direct current source of supply. The motor 18 will be selected for operation on the particular power supply available. If the series motors are to be operated for motoring the circuit controller 29 is operated to its first position for motoring. The connections thereby completed are shown in simplified form in Fig. 2. For the motoring operation it will be observed that the field windings 25 and 26 for the generators 15 and 16 are connected in series with a single control rheostat 31 to the positive and negative supply lines 41 and 42. With this arrangement the excitation of these generators is jointly controlled by the single rheostat so that each generator will supply its proper proportion of the load for different positions of the rheostat. The generator 15 is of much smaller capacity than the load generator 16 although it is designed to carry the full load current of the circuit. The voltage of the generator 15 is selected with reference to regenerative operation. For example, if the series motors 10 and 11 are arranged to be operated on a voltage of 750 volts and a potential difference of 75 volts is required during regeneration, it will be seen that the generator 15 will be designed to generate 75 volts with its armature carrying the full load current of the motors. The load generator 16 will then be designed to supply power at 675 volts so that the total voltage applied to the motors 10 and 11 during motoring operation may be 750 volts, corresponding to their rated voltages.

If it were not for the use of the auxiliary generator 15 during the motoring operations, the generator 16 would have to be designed to supply power at 750 volts. With my arrangement, however, the load generator 16 may be of less capacity inasmuch as the auxiliary generator will supply a portion of the load. Furthermore, by maintaining the auxiliary generator 15 in series circuit relation with the load generator 16 and the series motors 10 and 11, the switching required in changing from motoring to regenerative braking is greatly simplified.

For example, if regenerative braking is desired, it is only necessary to operate the controller 29 to its second position thereby establishing the connection shown in Fig. 3. It will be seen that the resistances 33 and 34 are connected in parallel with their corresponding field windings 13 and 12 and across the armature of the auxiliary generator 15. By means of these connections return circuits are provided from the field windings 12 and 13 to the auxiliary generator so that these windings will produce the necessary excitation for regeneration. Furthermore, the circuits through the resistors 33 and 34 provide return paths for the regenerative current produced by the motors 10 and 11 during braking.

In order to control the regenerative braking effort the controller 29 in its second position connects the rheostats 30 and 31 in series with their corresponding field windings 25 and 26 so that the excitation of these field windings may be independently varied to control the braking effort.

While I have shown a particular embodiment of my invention, it will be understood of course that I do not wish to be limited thereto, since many modifications may be made, and I therefore contemplate by the appended claims to cover any such modification as fall within the true spirit and scope of my invention.

What I claim as new and desire to secure by Letters Patent of the United States, is,—

1. In an electric driving system including a trolley and a ground connection, the combination of a series motor, a series field winding therefor, an auxiliary generator and a load generator permanently connected in series with each other and with said series motor, field windings for each of said generators, rheostatic means associated with each of said generator field windings, a driving motor for said generators connected between said trolley and said ground, means for connecting said generator field windings in series with each other and with one of said rheostatic means during motoring operation, and means for producing regenerative operation of said series motor comprising an electrical connection by-passing said motor field winding and said auxiliary generator armature whereby said auxiliary generator supplies excitation for regenerative braking of said series motor.

2. A variable voltage drive comprising a load generator, an auxiliary generator, and series motor-means connected in closed circuit relation with said generators, field windings for each of said generators, rheostatic means for each of said field windings, a resistance for each of the series windings of said motor means, and a circuit controller for connecting said generator field windings in series with each other and one of said rheostatic means for motoring, and for connecting said generator field windings in series with their respective rheostatic means, and for connecting each of said motor field resistances in parallel with its respective series winding of said motor-means and said auxiliary generator for regenerating.

3. The combination in a variable voltage drive including a series motor, of a load generator and an auxiliary generator, of means for permanently connecting said motor and said generators in closed circuit relation in series with each other, field windings for each of said generators, rheostatic means for each of said field windings, means for connecting said generator windings in series with each other and with field windings in series with each other and with one of said rheostatic means to control the speed of operation of said motor, means for producing regenerative operation of said motor comprising an electrical connection by-passing said motor field winding and the armature of said auxiliary generator, and means for controlling the field winding of said load generator independently of the field winding of said auxiliary generator during regenerative operation.

PETER W. FORSBERG.